(12) United States Patent
Olsson

(10) Patent No.: US 7,137,920 B2
(45) Date of Patent: Nov. 21, 2006

(54) TRANSMISSION ARRANGEMENT, USE OF SAID TRANSMISSION ARRANGEMENT AND A VEHICLE PROVIDED WITH SAID TRANSMISSION ARRANGEMENT

(75) Inventor: Karl-Erik Olsson, Lönsboda (SE)

(73) Assignee: Volvo Articulated Haulers AB, Växjö (SE)

( * ) Notice: Subject to any disclaimer, the term of this patent is extended or adjusted under 35 U.S.C. 154(b) by 0 days.

(21) Appl. No.: 10/707,782

(22) Filed: Jan. 12, 2004

(65) Prior Publication Data

US 2004/0204278 A1   Oct. 14, 2004

Related U.S. Application Data

(63) Continuation of application No. PCT/SE02/01204, filed on Jun. 19, 2002, now abandoned.

(30) Foreign Application Priority Data

Jul. 10, 2001  (SE)  .................................... 0102478

(51) Int. Cl.
F60K 48/06 (2006.01)
B60K 1/00 (2006.01)

(52) U.S. Cl. ........................ 475/150; 475/19; 475/153; 475/198; 475/254; 180/65.7

(58) Field of Classification Search .................... 475/5, 475/19, 150, 153, 198, 254; 180/65.3, 65.7, 180/372
See application file for complete search history.

(56) References Cited

U.S. PATENT DOCUMENTS

| | | | |
|---|---|---|---|
| 1,984,830 A | 12/1934 | Higley | |
| 3,799,284 A * | 3/1974 | Hender | 180/65.2 |
| 4,186,626 A * | 2/1980 | Chamberlain | 475/337 |
| 4,393,952 A * | 7/1983 | Schreiner | 180/6.44 |
| 4,973,295 A | 11/1990 | Lee | |
| 5,017,183 A | 5/1991 | Teraoka | |
| 5,390,751 A * | 2/1995 | Puetz et al. | 180/6.48 |
| 5,844,387 A * | 12/1998 | Mukai et al. | 318/432 |
| 6,098,737 A * | 8/2000 | Aoki | 180/242 |
| 6,325,736 B1 * | 12/2001 | Hamada et al. | 475/18 |

FOREIGN PATENT DOCUMENTS

| | | | |
|---|---|---|---|
| EP | 1288054 | * | 3/2003 |
| WO | WO 9534772 A1 | | 12/1995 |

\* cited by examiner

*Primary Examiner*—Ha Ho
(74) *Attorney, Agent, or Firm*—Novak Druce & Quigg, LLP

(57) ABSTRACT

Transmission method and arrangement for distributing tractive force in a vehicle between a first transmission branch (28a) and a second transmission branch (30). The transmission branches are connected to one another by way of a fork (28b) and one transmission branch (28a) is directly connectable to at least one wheel contact surface. The second transmission branch (30) is connected to the fork (28b) by way of a control unit (19), which is provided with control means (27) for varying the transmission ratio in this branch (30). The invention furthermore relates to a vehicle having at least two driving wheels (16, 16b, 17, 17b, 18, 18b) and the transmission arrangement specified above.

15 Claims, 5 Drawing Sheets ial Application No. PCT/SE02/01204 filed
TRANSMISSION ARRANGEMENT, USE OF SAID TRANSMISSION ARRANGEMENT AND A VEHICLE PROVIDED WITH SAID TRANSMISSION ARRANGEMENT

CROSS REFERENCE TO RELATED APPLICATIONS

The present application is a continuation patent application of International Application No. PCT/SE02/01204 filed 19 Jun. 2002 which was published in English pursuant to Article 21(2) of the Patent Cooperation Treaty, and which claims priority to Swedish Application No. 0102478-5 filed 10 Jul. 2001. Both applications are expressly incorporated herein by reference in their entireties.

BACKGROUND OF INVENTION

Technical Field

The present invention relates to a transmission arrangement for distributing tractive force (power) in a vehicle, between a first transmission branch and a second transmission branch, the transmission branches being connected to one another by way of a fork and one transmission branch being directly connectable to at least one wheel contact surface.

The invention furthermore relates to a vehicle having at least two driving wheels, comprising (including, but not limited to) a first transmission branch and a second transmission branch, the transmission branches being connected to one another by way of a fork and one transmission branch being directly connectable to at least one wheel contact surface.

BACKGROUND OF INVENTION

A fundamental problem in all vehicles with drive to multiple wheel contact surfaces is how the driving force is distributed. It is desirable to control the speed of the wheels so that the wheel slip in the longitudinal direction is the same at all wheel contact surfaces, since excessive wheel slip at individual wheel contact surfaces is thereby prevented. The wheel slip is the scaled difference between the speed of the wheel at the wheel contact surface and speed of the ground at the same point. Low tractive force at contact surfaces with low friction is automatically compensated for by increased tractive force at contact surfaces with high friction.

Given similar ground conditions, the coefficients of friction utilized will be approximately the same regardless of the prevailing vertical load at each wheel contact surface. This means that the tractive force is automatically distributed in proportion to the vertical load, which gives optimum efficiency in transmitting force to the ground.

One easy way of producing the desired equality in longitudinal slip is to mechanically connect the driving of all wheel contact surfaces in the driveline. Problems arise, however, when cornering. In this context the ground will move at different speeds at the various wheel contact surfaces. The ground under the outer wheels moves at a higher speed than the corresponding inner wheels since the outer wheels have a greater distance to cover in the same time as the inner wheels.

For the same reason, the ground under the front wheels generally moves at a higher speed than under the rear wheels. In certain articulated vehicles, such as loaders, the drive to the front and rear axle is mechanically linked. The aim is to eliminate the problem of different speeds under the two axles by placing the steering joint midway between the front and rear axle, which when driving with a constant radius of curvature gives the same ground speed under both axles. The rotational speeds are the same due to the mechanically linked drive. With superelevation of the stationary vehicle, however, which is a common working situation for loaders, the two axles will be drawn closer to one another which means that the ground under each axle moves in opposite directions. This results in slipping at the wheel contact surfaces and loads in the driveline that will reduce its service life. There is obviously also the outstanding inner/outer wheel problem.

In the majority of vehicles, such as four-wheel drive cars, trucks with 4×4 and 6×6 drive and articulated transport vehicles, the vehicle concepts are such that it is impossible to alleviate the front/rear axle problem through suitable location of the steering joint.

The problem of also distributing the tractive force when cornering is conventionally solved by dividing the torque in a specific ratio by means of a differential. The rotational speed is then controlled by the speed of the ground at the various contact surfaces and by the wheel slip. The fact that wheel slip is not controllable, however, is something of a disadvantage. If the product of the vertical load and the ground friction does not correspond to the torque ratio in the differential, the wheel slip may increase uncontrollably, the wheels slip and the total tractive force transmitted is limited by the slipping wheel contact surface.

The difficulty of the uncontrolled wheel slip is usually alleviated by various measures for braking the wheel slip, for example by using so-called differential locks. A dog clutch which mechanically locks the differential is the oldest and still perhaps the most common solution. The disadvantage is that the speed differential when cornering manifests itself as wheel slip at the actual wheel contact surfaces. This produces great torque loads, which shortens driveline service lives, increases losses and results in heavy tire wear.

Another solution aimed at limiting the slip in the case of differentials is to use the service brake to increase torque at the slipping wheel contact surface and thereby control the slip. The difference in rotational speed in braking corresponds to the vehicle speed, which can result in certain losses.

If the brake torque is instead applied inside the rotating differential, the difference in rotational speed will correspond to the difference in the curve radius and thereby give rise to smaller losses than in the solution using the service brake. In straight-line driving no losses are sustained since the difference in rotational speed is zero. Various solutions are adopted for solving the problem of controlling the brake torque via the differential. One common solution is based on the fact that the brake torque increases in proportion to the transmitted drive torque, through discs or friction in the gear system. Such solutions will result in braking when cornering, even in the current absence of slipping at a wheel contact surface. This results in losses and wear.

It is usual, especially on passenger cars with 4WD, for the main drive to occur on one axle, the second axle contributing to the drive in the event of a rotational speed difference between the axles. So-called viscous couplings are an example of this type of solution, the torque on the second axle increasing when the difference in rotational speed increases. In another similar solution, the difference in rotational speed builds up a cumulative hydraulic pressure, which actuates a multiple disc clutch, which transmits drive torque to the second axle. If the drive axle slips, a difference in rotational speed is created, which transmits torque to the second axle. This is all very well if the vehicle is running in a straight line. When cornering, a difference in rotational speed occurs between front and rear axles because the front axle travels a greater distance than does the rear axle in the same time period. The coupling between front and rear axle cannot differentiate whether the difference in speed is the result of slipping wheels or of cornering. A load is therefore produced, by way of the driveline coupling, between the front and rear axle. This manifests itself as slipping in opposite directions at the wheel contact surfaces of the two axles, which gives rise to forces, braking forces on the front axle and driving forces on the rear axle. Drive torque forces add to this, which can lead to the rear axle slipping away when cornering, the driver being unable to anticipate such behavior. This is obviously a safety risk.

This is accentuated by the tires used on passenger cars nowadays, which are designed to provide high "cornering stiffness;" that is to say, high lateral force absorption at a small angle of drift. This also results in high longitudinal force absorption in the event of slight wheel slip, which means that high longitudinal force is attained even in the event of moderate wheel slip. However, the capacity to withstand lateral force falls rapidly with increased longitudinal force so that the conditions for uncontrolled skidding are soon reached.

SUMMARY OF INVENTION

An object of the invention is to provide a safe, simple and robust energy and cost-effective solution to the problem(s) described above, and which gives small losses and a long service life through the ability to avoid high torque loads when cornering. A transmission arrangement designed for achieving this objective, that is for distributing tractive force in a vehicle between a first transmission branch and a second transmission branch, has transmission branches that are connected to one another by way of a fork and one transmission branch being directly connectable to at least one wheel contact surface. According to the invention, the second transmission branch is connected to the fork by way of a control unit provided with control means for varying the transmission ratio in this branch. Through this design of the transmission arrangement, a transmission ratio between an input shaft and an output shaft can be adjusted with great accuracy. The solution according to the invention eliminates both the differential and the disadvantages thereof. The transmission ratio is suitably continuously variable.

According to one embodiment of the invention, the control unit comprises a planetary gear-set with sun gear, planet carrier with planet wheels and internal gear, together with a control motor that is designed to influence the transmission ratio of the planetary gear-set.

The control motor is suitably connected to the planetary gear-set by way of an element having a large difference in efficiency between the drive directions. The element may consist, for example, of a worm gear. Alternatively the element consists of a hypoid gear.

According to one embodiment of the invention, the control motor is connected to the sun gear.

According to another embodiment of the invention, the control unit comprises a continuously variable gear.

A vehicle configured according to the teachings of the invention has at least two drive wheels comprises a first transmission branch and a second transmission branch. The transmission branches are connected to one another by way of a fork and one transmission branch being directly connectable to at least one wheel contact surface. The second transmission branch is connected to the fork by way of a control unit that is provided with control means for varying the transmission ratio in this branch.

In a preferred embodiment of such a vehicle, the control unit uses the steering lock angle of the vehicle as control parameter.

According to another embodiment or variant of the vehicle, the control unit comprises a planetary gear-set, with sun gear, planet wheels and internal gear, the sun gear being connected to a control motor, which is designed to influence the transmission ratio of the planetary gear-set.

In this case, the connection between the internal gear and the axle differential may extend coaxially through the sun gear, the control motor interacting with the sun gear by way of a gear. In addition, input and output shafts may be arranged coaxially or parallel, depending on the actual installation.

Alternatively, the control unit may be fitted between an output drive shaft emerging from the axle differential and a second axle differential in such a way that the drive shaft interacts directly with the planet wheels and the second axle differential interacts directly with an internal gear.

Further still, the control unit may be fitted between a drive shaft and a hub reduction gear in such a way that the drive shaft interacts directly with the internal gear of the control unit and the planet wheels of the control unit interacts directly with the sun gear of the hub reduction gear. The control unit and the hub reduction gear can thereby be jointly fitted in a suspension arm that is pivoted coaxially with the drive shaft.

According to yet another advantageous embodiment of the invention, the vehicle is an articulated truck, such as a dumper.

BRIEF DESCRIPTION OF DRAWINGS

The invention will be described in more detail below, with reference to embodiments illustrated in the accompanying drawings, in which.

DETAILED DESCRIPTION

Figure 1:
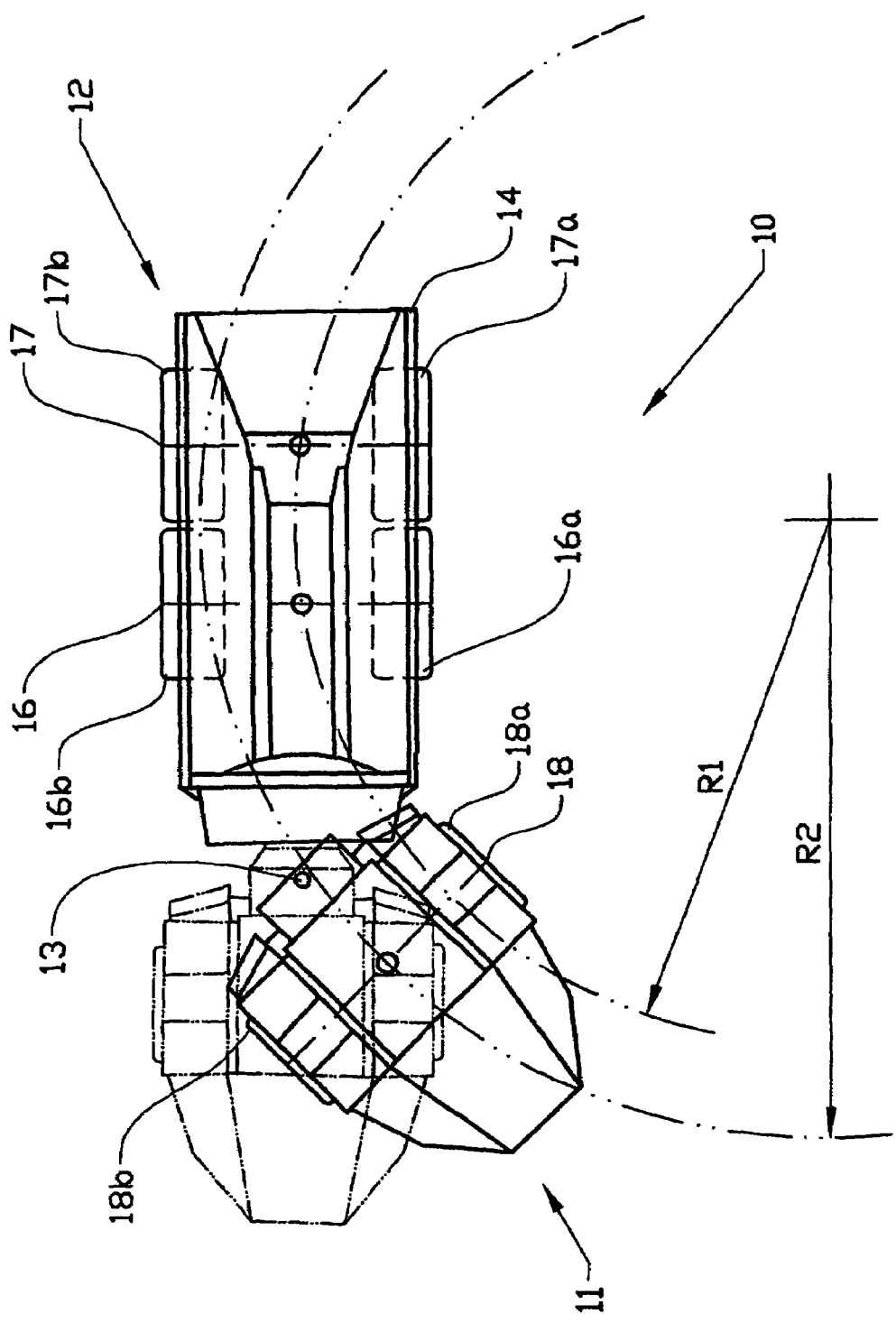
FIG. 1 shows a top view of an articulated truck of known design, and in which, when cornering, the part of the vehicle carrying the engine is swiveled relative to the load-carrying part.

FIG. 1 shows a top view of an articulated truck 10 of the so-called dumper type which in a known manner has a front vehicle part 11 carrying the engine and a rear vehicle part 12 carrying the load. The two vehicle parts are connected by way of a vertical articulated shaft 13. The load-carrying vehicle part is provided with a tipping load body 14, which can be raised/tipped by means of hydraulic cylinders 15. The vehicle parts 11, 12 are also connected to one another in a known manner so that they can pivot about a horizontal articulated shaft in a manner that enables the vehicle parts to rotate in relation to one another about the longitudinal axis of the vehicle. Hydraulic cylinders that are arranged on either side of the articulated shaft 4 are used for steering the vehicle when cornering, the front part of the vehicle being angled about the vertical articulated shaft 13.

According to the state of the art, the drive torque delivered by the vehicle engine is transmitted to the first wheel axle 16 arranged on the load-carrying part 12 of the vehicle by way of a mechanical transmission comprising a first cardan shaft, which connects' the vehicle gearbox to the differential of the wheel axle 16. A second cardan shaft is arranged between the first wheel axle and a further wheel axle 17 arranged on the load-carrying part of the vehicle 12, for transmission of the drive torque delivered by the engine. Each of the wheel axles 16, 17 is provided with wheels 16a, 16b, 17a, 17b. The engine-carrying part 11 of the vehicle is provided with a wheel axle 18 having wheels 18a, 18b.

Since the distance between each vehicle axle 16, 17 and 18 and the vertical shaft 13 varies greatly, the wheel axles will follow essentially different turning radius when cornering. Thus the wheel axles 16, 17 on the load-carrying part of the vehicle follow the turning radius R1, while the wheel axle 18 on the engine-carrying part of the vehicle follows the turning radius R2. Due to the fact that the turning radius R2 is substantially larger than the turning radius R1, the wheels 18a, 18b must cover a significantly longer distance than the wheels on the load-carrying part of the vehicle. In order to prevent these differences from giving rise to torque load in the power transmission from the engine to the individual wheels, there is a need for an individual adjustment of the rotational speed on each wheel axle.

Figure 2:
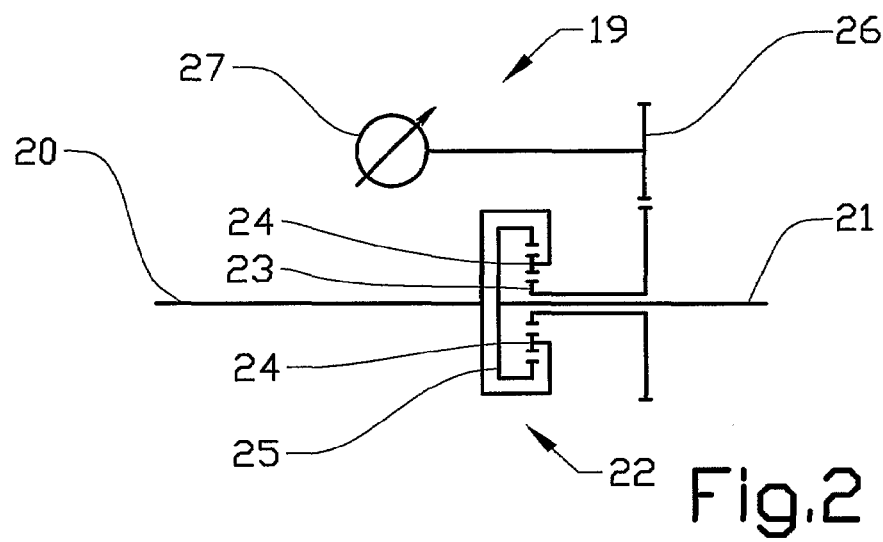
FIG. 2 shows a diagram of a transmission arrangement configured according to the teachings of the present invention.

FIG. 2 shows a transmission arrangement configured according to one embodiment of the present invention. This embodiment comprises a control unit 19 which may be connected to an engine by way of an input shaft 20, and connected to a drive shaft by way of an output shaft 21. In this exemplary embodiment, the control unit 19 comprises a planetary gear-set 22 having a sun gear 23, a planet carrier with a number of planet wheels 24 and an internal gear 25. The sun gear 23 is connected by way of a gear 26 to a control motor 27. The control motor 27 is normally idle, a fixed transmission ratio being obtained between the input shaft 20, which in this exemplary embodiment is connected to the planet carrier 24a, and the output shaft 21, which in this exemplary embodiment is connected to the internal gear 25. When the control motor 27 begins to drive the sun gear 23, the transmission ratio is modified so that the internal gear rotates faster with a continuously variable speed which varies as a function of the speed of the control motor. Variants of planetary gear-sets other than that described above are feasible. The control motor 27 may comprise a continuously variable gear.

The control motor 27 may be connected to the planetary gear-set by way of an element having a greatly differing efficiency between the drive directions. For example, this element may be a worm or hypoid gear assembled together with the control motor.

Other variants of planetary gear-sets or a conventional, mechanical continuously variable gear may be alternatives to the planetary gear-set 22 used in the control unit 19 according to FIG. 2.

Figure 3:
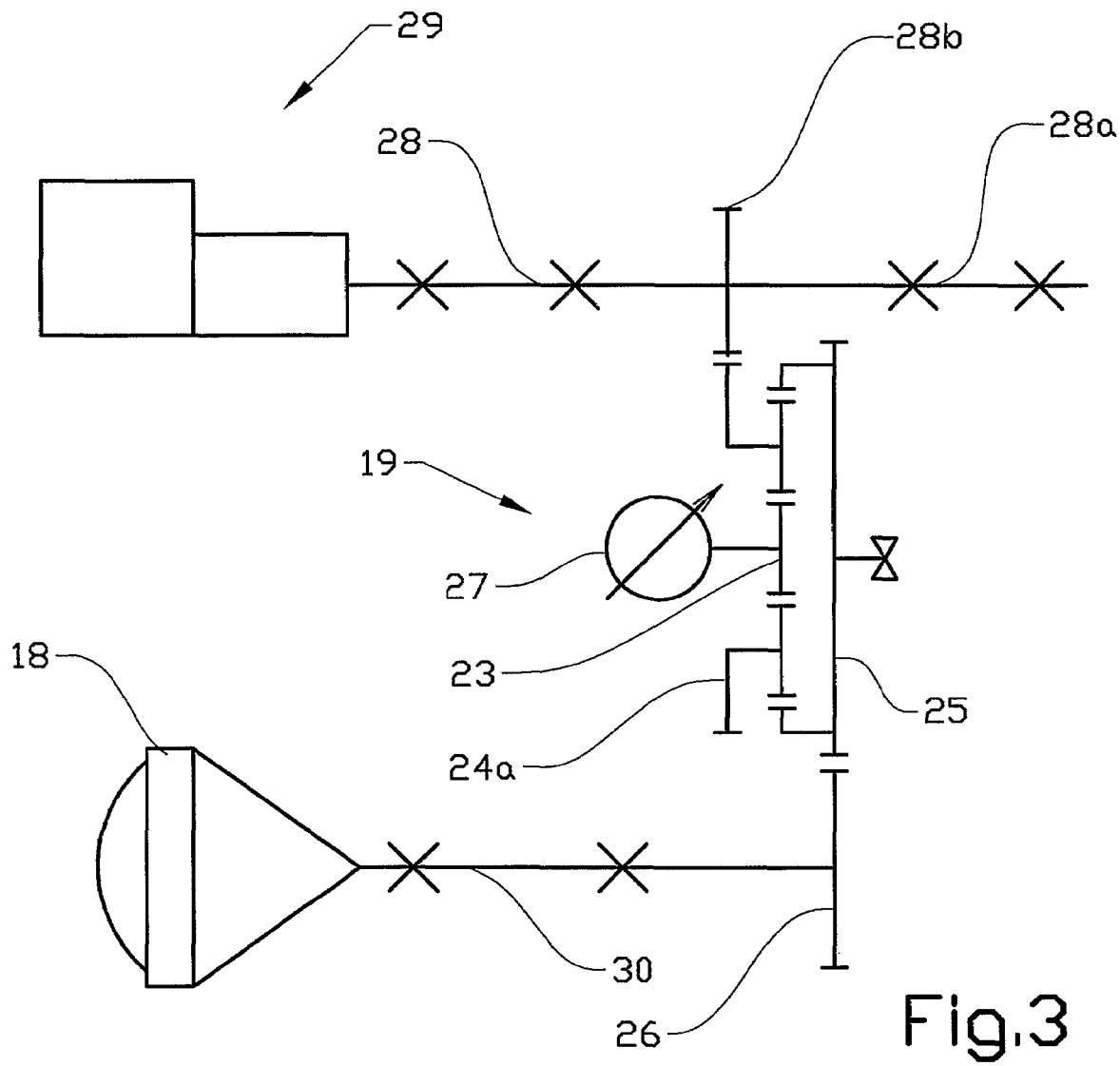
FIG. 3 shows a diagram of a transmission arrangement configured according to the teachings of the present invention in a first application, forming part of a transmission for an off-road vehicle.

FIG. 3 shows a variant of the invention in which the control unit 19 is located between a drive shaft 28, which extends between an engine 29 and a differential housing situated in the load-carrying part 12 of the vehicle and connected to either of the wheel axles 16, 17, and a drive shaft 30 which is connected to a differential housing, situated in the engine-carrying part 11 of the vehicle and connected to the wheel axle 18. Here, the control unit 19 is used for speed adjustment of the wheel axle 18, for example when cornering.

Figure 4:
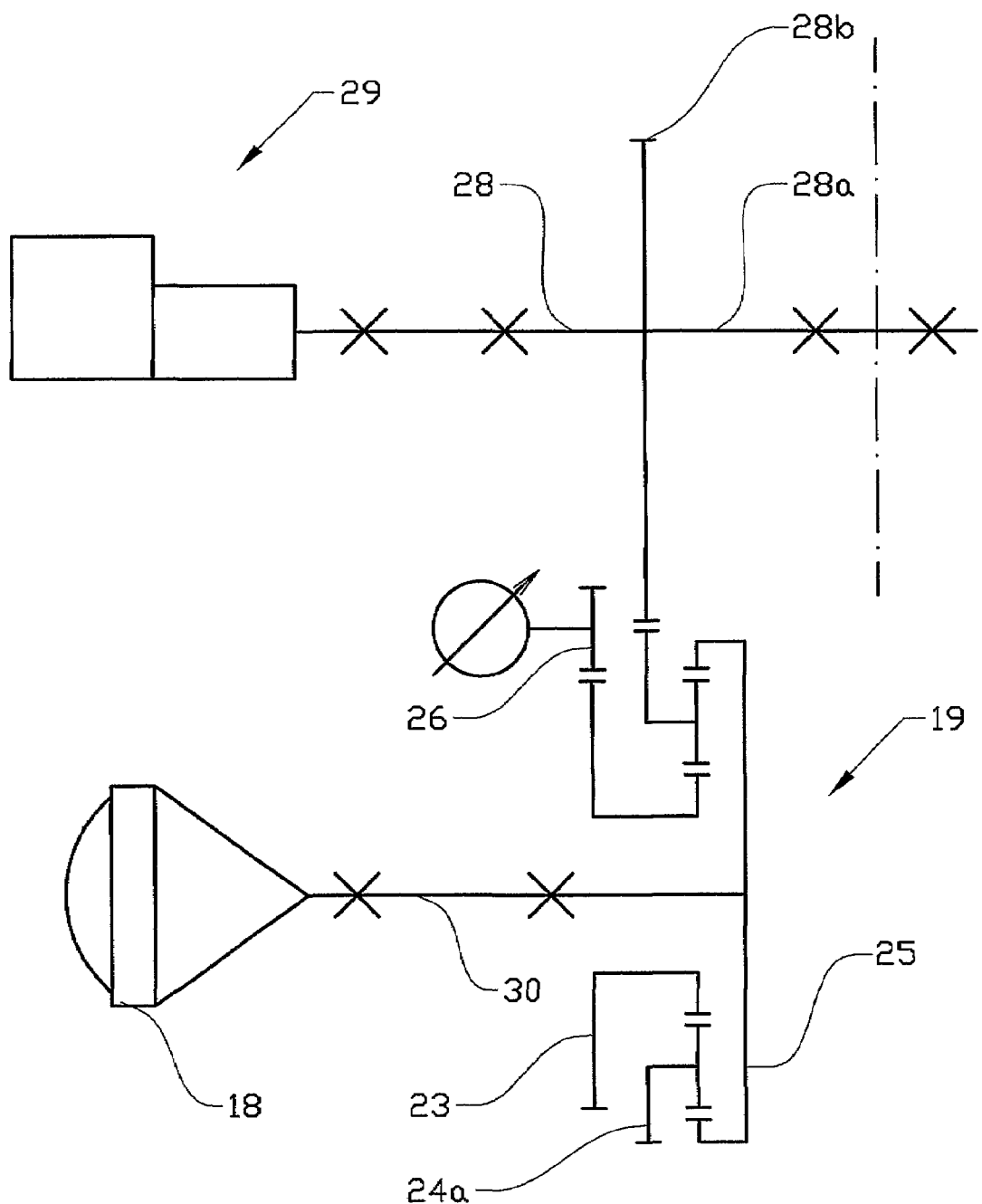
FIG. 4 shows a diagram of a transmission arrangement configured according to the teachings of the present invention in a second application, forming part of a transmission for an off-road vehicle.

FIG. 4 shows another variant of the invention in which the control unit 19 is located between the drive shaft 28 and the drive shaft 30 in a way corresponding to the previous exemplary embodiment. One difference is that the internal gear 25 is connected to the drive shaft 30 by way of a shaft extending concentrically through the sun gear 23. This variant of the invention gives a more compact installation than the preceding exemplary embodiment.

Figure 5:
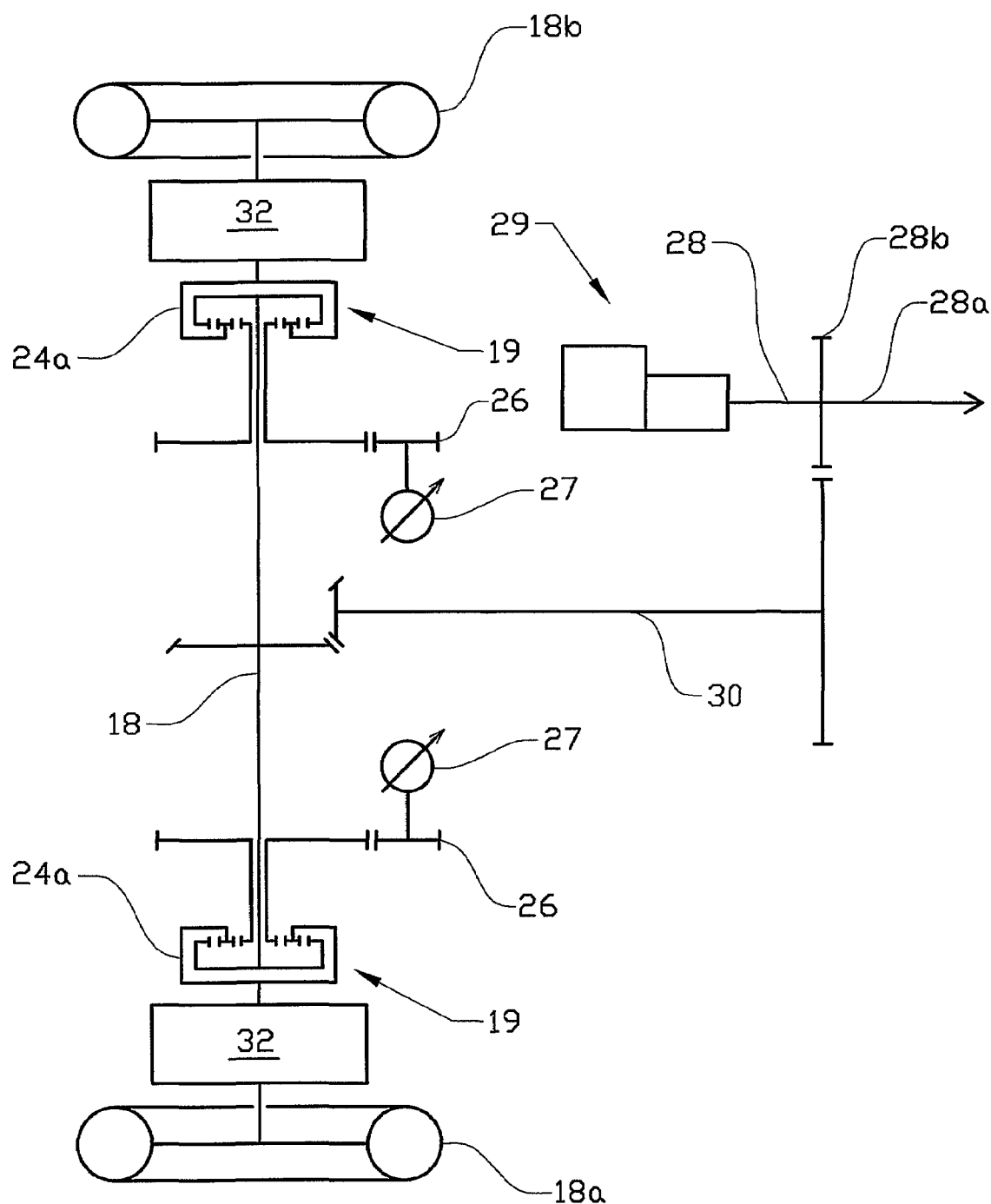
FIG. 5 shows a diagram of a transmission arrangement configured according to the teachings of the present invention in a third application, forming part of a transmission for an off-road vehicle.

FIG. 5 shows another variant of the invention in which the wheel axle 18 is equipped with two control units 19, one for each front wheel. In this case the drive torque is fed by way of the drive shaft 30 and an angular transmission 31 to the wheel axle 18 which is connected to the internal gear 25 concentrically through the sun gear 23. The planet carrier 24a is in turn connected to the gear 18b by way of a conventional hub reduction gear 32. In this case the speed of both wheels of the wheel axle 18 can be individually and continuously varied which means that there is no need for a conventional inter-axle differential and axle differential.

Figure 6:
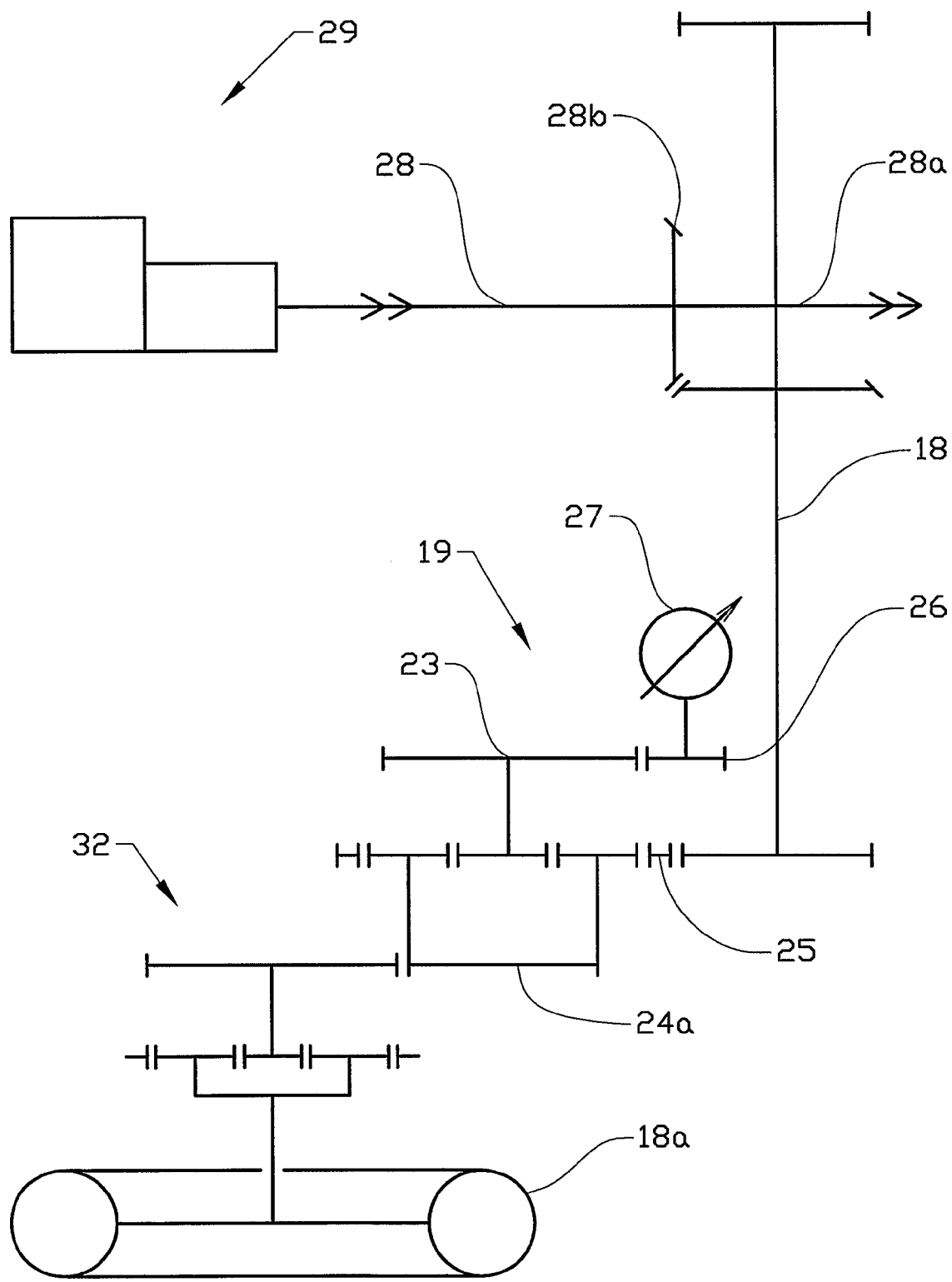
FIG. 6 shows a diagram of a transmission arrangement configured according to the teachings of the present invention in a fourth application, forming part of a transmission for an off-road vehicle.

FIG. 6 shows a variant of the preceding exemplary embodiment of the invention, in which the wheel axle 18 is provided with two control units 19, one for each front wheel, of which only one control unit is shown in FIG. 6. In this case, each control unit may be located in a suspension arm 33 which is concentrically supported on one side of the vehicle frame in relation to the wheel axle 18. This solution gives great freedom of installation in the vehicle, for example in locating the drive system. Furthermore, the transmission unit of each front wheel can be made readily accessible for servicing work.

The control unit 19 is suitably designed so that it functions with the minimum loss of power in the most common application for the vehicle, for example in straight-line driving. By detecting the steering lock angle of the steering system, the speed of each wheel can be adjusted to cornering requirements. The control unit is capable of active driving/braking whilst cornering in order to reduce the steering radius of the vehicle. The drive/brake torque of the vehicle can also be reduced on any bogie wheel in order to reduce the risk of skidding. Compared to conventional traction control systems, arrangements configured according to the present invention are capable of controlling the drive torque more effectively since drive torque can be shifted from a slipping wheel (reduced) to a non-slipping wheel (increased). The invention also makes it possible to readily adjust the drive torque distribution in a vehicle in consideration of load conditions. For example, the drive power can be distributed differently between the axles depending on whether or not the vehicle is loaded.

The invention must not be regarded as being limited to the exemplary embodiments described above, a number of further variants and modifications being feasible without departing from the scope of the claims. The invention may be used at a plurality of points in a vehicle, for example as a replacement for various differentials, or in power transmissions between a tractor vehicle and a driven car or trailer.

The invention claimed is:

1. A vehicle having said at least two pairs of driving wheels wherein at least one of said pairs is steerable in relation to the longitudinal axis of said vehicle, said vehicle comprising:
a first transmission branch;
a second transmission branch;
at least two control units, each comprising a planetary gear set and a control motor, said planetary gear set comprising a sun gear, an internal gear, and planet wheels; and
a hub reduction gear, wherein said transmission branches are connected to one another by way of a fork and one of said transmission branches comprises a drive shaft, said control units disposed between said drive shaft and a driving wheel, said control motor interacting with said sun gear by way of a gear, said drive shaft interacting with said internal gear by way of a coaxial connection through said sun gear, said driving wheel interacting with said planet wheels, said control motor influencing the planetary gear-set to vary the transmission ratio of said second branch, said hub reduction gear disposed between said planet wheels and said driving wheel, and wherein each of a plurality of steerable wheels is connected to said drive shaft by way of one of said control units.

2. The vehicle as recited in claim 1, further comprising:
said first transmission branch operatively connected to a first pair of driving wheels; and
said second transmission branch operatively connected to a second pair of driving wheels, said first and second transmission branches rotatively connected to one another and at least one of said first and second transmission branches comprising at least two control units, one for each driving wheel thereof, each of said at least two control units comprising control means for varying a transmission ratio of a respective driving wheel.

3. The vehicle as recited in claim 2, wherein each said control unit utilizes a steering lock angle of the vehicle as a control parameter.

4. The vehicle as recited in claim 2, wherein each said control unit comprises the planetary gear-set and the control motor configured to influence the transmission ratio of the planetary gear-set.

5. The vehicle as recited in claim 4, wherein the planetary gear-set comprises said sun gear, a planet carrier with said planet wheels and said internal gear.

6. The vehicle as recited in claim 5, wherein said planetary gear-set and said control motor are connected by a hypoid gear.

7. The vehicle as recited in claim 4, wherein the control motor is connected to said sun gear of said planetary gear-set.

8. The vehicle as recited in claim 7, wherein a connection between said internal gear and an axle differential extends coaxially through the sun gear and the control motor is configured to interact with the sun gear by way of said gear.

9. The vehicle as recited in claim 7, wherein the control unit is disposed between said drive shaft and said driving wheel so that the drive shaft interacts with said internal gear of said planetary gear-set and the driving wheel interacts with the planet wheels of said planetary gear-set.

10. The vehicle as recited in claim 9, wherein said hub reduction gear is arranged between the planet wheels and the driving wheel.

11. The vehicle as recited in claim 10, wherein the connection between the internal gear and the drive shaft extends coaxially through the sun gear, and the control motor interacts with the sun gear by way of said gear.

12. The vehicle as recited in claim 7, wherein the control unit is disposed between said drive shaft and said hub reduction gear so that the drive shaft interacts with said internal gear of the control unit and said planet wheels of the control unit interact with the sun gear of the hub reduction gear.

13. The vehicle as recited in claim 2, wherein the vehicle is articulated.

14. The vehicle as recited in claim 2, wherein during cornering of said vehicle a speed of one of said driving wheels of at least one of said pair of driving wheels is varied relative to a speed of the other of said driving wheels.

15. The vehicle as recited in claim 2, wherein said control units comprise said planetary gear-set and said control motor for influencing the transmission ratio of said planetary gear set.

* * * * *